United States Patent [19]

Davidson et al.

[11] Patent Number: 5,774,540
[45] Date of Patent: Jun. 30, 1998

[54] HIERARCHICAL MENU SCREEN INTERFACE FOR DISPLAYING AND ACCESSING TELEPHONE TERMINAL FEATURES

[75] Inventors: Joanne W. Davidson, Keansburg; William F. Dudley, Jr., Jackson; David A. Fishman, Lakewood, all of N.J.; David M. Gresham, East Hampton, N.Y.; Kenneth Kasiske, Jackson, N.J.; Michael L. Moroze, Broomfield, Colo.; Elizabeth Bauer-Nilsen Sanders, Columbus, Ohio; Alessandro A. Subrizi, San Francisco, Calif.; Susan L. Tuttle, East Windsor, N.J.

[73] Assignee: Lucent Technologies Inc., Murray Hill, N.J.

[21] Appl. No.: 559,517

[22] Filed: Nov. 15, 1995

(Under 37 CFR 1.47)

[51] Int. Cl.⁶ .................................................. H04M 1/00
[52] U.S. Cl. .................. 379/387; 379/93.17; 379/93.23; 379/142; 379/396; 345/33; 345/902
[58] Field of Search .............................. 379/96, 354, 396, 379/142, 201, 202, 122, 93.23, 93.17, 387; 345/33, 50, 55, 901, 902, 156

[56] References Cited

U.S. PATENT DOCUMENTS

| 4,481,382 | 11/1984 | Villa-Real | 379/61 |
|---|---|---|---|
| 5,327,486 | 7/1994 | Wolff et al. | 379/93.23 |
| 5,349,629 | 9/1994 | Kumano | 379/58 |
| 5,371,788 | 12/1994 | Baals et al. | 379/396 |
| 5,373,551 | 12/1994 | Baals et al. | 379/110 |
| 5,386,460 | 1/1995 | Boakes et al. | 345/902 |
| 5,412,713 | 5/1995 | Baals et al. | 379/96 |
| 5,436,954 | 7/1995 | Nishiyama et al. | 379/58 |
| 5,479,476 | 12/1995 | Finke-Anlauff | 379/201 |
| 5,486,843 | 1/1996 | Otting et al. | 345/35 |
| 5,487,104 | 1/1996 | Baals et al. | 379/96 |
| 5,526,422 | 6/1996 | Keen | 379/396 |
| 5,552,806 | 9/1996 | Lenchik | 345/156 |
| 5,559,945 | 9/1996 | Beaudet et al. | 395/353 |
| 5,629,733 | 5/1997 | Youman et al. | 345/902 |
| 5,655,014 | 8/1997 | Walsh et al. | 379/201 |
| 5,657,378 | 8/1997 | Haddock et al. | 379/93.23 |

Primary Examiner—Krista Zele
Assistant Examiner—Scott Wolinsky
Attorney, Agent, or Firm—Samuel R. Williamson

[57] ABSTRACT

A user of a telephone terminal with an interactive display is provided complete access to all feature choices in a hierarchical menu through a minimum number of menu keys. These menu keys include a "Next" key, a "Back" key, a "Select" key and a "Home" key. These menu keys occupy minimal space on the housing of the telephone terminal, yet enable the user of the terminal to easily scroll to and select every feature in the interactive display. The user is able to quickly develop a mental model of the feature choices and easily navigate through these menu selections. Context-sensitive functionality also is provided for using the interactive display. As a user completes a command function, the feature choice presented to the user for this function is the one most likely to be accessed by the user, thus advantageously avoiding the necessity of having a dedicated key for allowing the user to select this feature choice.

26 Claims, 7 Drawing Sheets 5,774,540

HIERARCHICAL MENU SCREEN INTERFACE FOR DISPLAYING AND ACCESSING TELEPHONE TERMINAL FEATURES

BACKGROUND OF THE INVENTION

1. Technical Field

This invention is directed to telephone terminals and more particularly, to a telephone terminal configurable by a user for accessing features available on the terminal through an interactive display arrangement.

2. Description of the Prior Art

Current trends in the design of telephone terminals indicate that more and more of telephone functionality is being integrated into the telephone display on the terminal. For example, information as to the features available on the display has migrated from light emitting diodes (LEDs) to the display, and local additions such as directories, incoming caller information and the like, are all migrating to the display.

The technology presently in use in telephone displays is character-based liquid crystal device (LCD) displays. These displays are configured in various array sizes such as, for example, a 2 line by 10 character LCD display and a 3 line by 12 character LCD display. In order to be artfully incorporated into the telephone housing of some telephone terminals, by way of example, the recently introduced AT&T 3760 and 3770 wireless telephone terminals, these displays tend to be small, typically on the order of one inch in height. Also, in order to provide a reasonable number of characters for information such as caller information and directory access information, a small font size for the characters is generally used.

Most telephone terminals employ a user interface for assisting a user to access the directory and perform other specific functions by interacting with information shown in the telephone display on the terminal. Typically, wireless telephone terminals have utilized dedicated keys in the user interface to perform the specific functions. In addition to menu and command key functions being assigned to dedicated keys, there are also specifically dedicated keys on these terminals for storing numbers, recalling numbers, and clearing digits. Examples of typical labels that appear on these keys in some wireless telephone terminals are, "STO" for store, "RCL" for recall and "CLR" for clear.

Dedicated keys do improve the ease with which one uses a display, albeit once a user becomes familiar with them. These keys also, unfortunately, occupy space in the user interface and thereby otherwise limit possible size reductions in this interface. As wireless telephone terminals continue to decrease in size, in view of most of its internal circuitry being integrated into small application-specific-integrated circuits, the requirement for employing these dedicated keys limits further reductions in the size of the telephone terminal. Moreover, as new features are added to either the telephone terminal's or network's capabilities, additional dedicated keys must be added to the terminal inasmuch as dedicated keys would not easily accommodate the different functionality associated with such expansion. It is therefore desirable to provide a wireless telephone terminal that will accommodate all of the functions provided by the above described dedicated keys and others, and also any possible expansion functions, without actually requiring such keys to be a part of the user interface.

SUMMARY OF THE INVENTION

The prior art problem is solved in accordance with the present invention by providing a user of a telephone terminal with an interactive display, wherein complete access to all of the feature choices in a hierarchical menu is provided through a minimum number of menu keys.

A set of menu keys or buttons in a user interface provides, in accordance with a first aspect of the invention, quick access to all features of the telephone terminal through a plurality of menu screens with just a few key presses of these menu keys. The menu keys include a "Next" key, a "Back" key, a "Select" key and a "Home" key. The Next key allows a user to go forward from one menu screen to another menu screen in the interface. The Back key allows a user to go back from one menu screen to another menu screen. The Select key selects or advances to a feature choice which is displayed in the menu screen. Finally, the Home key is used to return a user to an original or starting menu screen in the plurality of menu screens.

As new features are added to the telephone terminal's or network's capabilities, the menu keys in the user interface allow the user to interact with these new features in the same manner as with the currently available features. These keys occupy minimal space on the housing of the telephone terminal, yet enable the user of the terminal to easily scroll to and select every feature in the interactive display. The user is able to quickly develop a mental model of the feature choices and easily navigate through these menu selections.

To assist a user in interacting with the user interface, in accordance with a second aspect of the invention, context-sensitive functionality is provided for using the interactive display. As a user completes a command function such as either entering digits, going off hook into a conversation mode or going on-hook into a standby mode, for example, the menu choices available to the user for each one of these functions change to reflect the most likely function desired to be accessed by the user, thus advantageously avoiding the necessity of having dedicated keys for allowing the user to select these desired menu choices.

BRIEF DESCRIPTION OF THE DRAWING

This invention and its mode of operation will be more clearly understood from the following detailed description when read with the appended drawing in which.

Throughout the drawing, the same elements when shown in more than one figure are designated by the same reference numerals.

DETAILED DESCRIPTION

Figure 1:
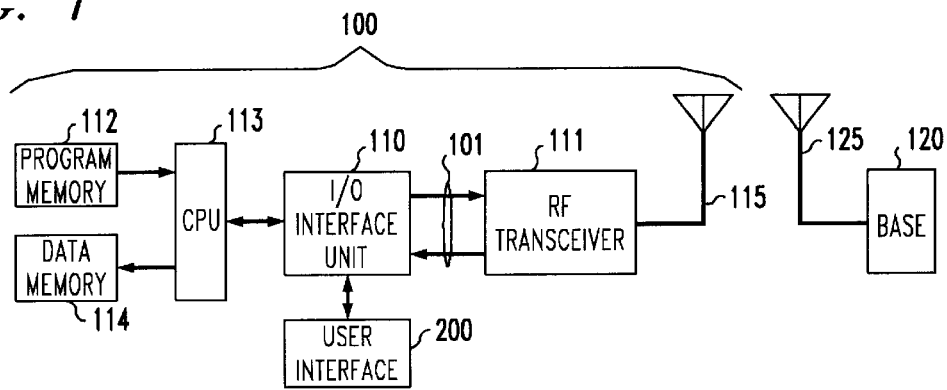
FIG. 1 is a block diagram of a wireless telephone terminal and a base unit, the telephone terminal being usable for incorporating the present invention.

Referring now to FIG. 1, there is shown an illustrative block diagram of a wireless telephone terminal 100 useful for describing the operation of the present invention. The terminal includes an input/output (I/O) interface unit 110 which, via connection 101 connects to a radio frequency (RF) transceiver 111 containing a transmitter and receiver for providing communications in, by way of illustrative example, a cellular radio system.

Various types of cellular radio systems are known in the art and have been otherwise described. Once such system is described in *The Bell System Technical Journal*, Volume 58, January 1979, Number 1, particularly in papers entitled "Advanced Mobile Phone Service: Introduction, Background and Objectives" by W. R. Young and "The Cellular Concept" by V. H. MacDonald.

The RF transceiver 111 may also provide communications suitable for operating in a cordless telephone system. Such a cordless telephone system is described in U.S. Pat. Nos. 4,706,274 and 5,044,010, for example.

This I/O interface unit 110 contains switching and control circuits required by the terminal 100 for establishing, maintaining and terminating RF communications connections between terminal 100 and base unit 120. Through these circuits and via antennas 115 and 125, the terminal 100 thus sends to and receives the appropriate signals from the base unit via the RF transceiver 111.

The terminal 100 also includes a program memory 112 which provides instructions to a central processor unit (CPU) 113 for controlling the various operating features and functions originating at the terminal. This program memory 112 contains data for interpreting a plurality of codes representative of various control signals received from the base unit 120 and for generating codes to be transmitted to the base unit 120. A data memory 114 is utilized by the CPU 113 for storing and accessing data associated with performing the various functions and features programmed in the program memory 112. In the described embodiment, CPU 113 is a microprocessor, program memory 112 is read-only-memory (ROM) and data memory 114 is a random-access-memory (RAM). These components are readily available from a number of semiconductor manufacturers such as Intel, Motorola, AMD and NEC. Connected to the interface unit 110 is a user interface 200, the physical aspects of which are shown in greater detail in FIG. 2.

Figure 2:
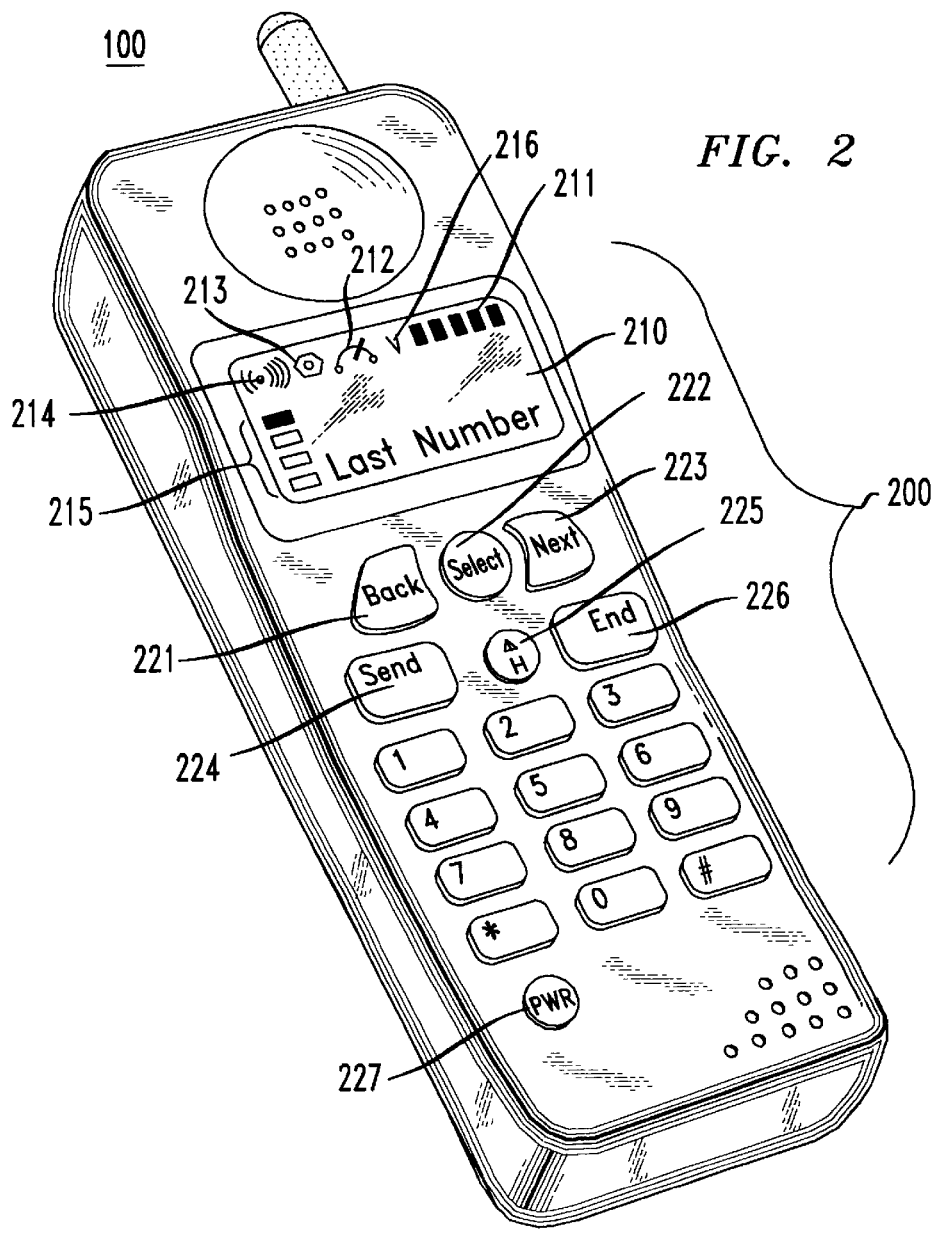
FIG. 2 illustrates the telephone terminal of FIG. 1 including a user interactive display displaying a first menu screen accessible in accordance with the present invention.

With reference now to FIG. 2, the user interface 200 comprises a user interactive display 210 which includes a number of screen display symbols. Such screen display symbols include a battery level symbol 211, an on-call/no-service symbol 212, a system indicator 213, a signal strength symbol 214, and a voice mail waiting symbol 216.

The battery level symbol 211 consists of five battery icons or symbols for showing the battery power level. At full charge, all symbols are filled in. As the battery loses power, the filled-in part of each one of the symbols is removed leaving the symbol outline. When only one filled-in symbol remains, it is an indication to the user to recharge the battery. The on-call/no-service symbol 212 is displayed when a telephone call is in progress. The handset with a diagonal slash appears in this service symbol when telephone service is not available. The system indicator 213 identifies the type of system in which the telephone terminal 100 is being used. For example, in a cellular system, an "A" or "B" symbol is displayed. The signal strength symbol 214 provides an indication of the received signal strength. This symbol is largest when the received signal is strong and becomes smaller as the received signal becomes weaker. The voice mail waiting symbol 216 appears when the user has a voice mail message waiting.

The user interactive display 210 also includes a menu level indicator 215. This menu level indicator includes a number of symbols comprising rectangularly outlined boxes aligned in a column on a side of the screen display. Menu options and other information, to be described later herein, are provided by the one or more filled-in rectangular boxes. When a menu option is being displayed on the menu screen, only one rectangular box is filled in for reflecting that option. The menu level indicator 215 informs a user as to how many menu options are available by displaying a corresponding number of vertically aligned rectangular boxes. The menu level indicator 215 also informs a user just which one of the menu options is currently active by darkening or filling in the one rectangular box associated with that menu screen option.

Also shown in the user interface 200 is a set of menu keys or buttons which provides, in accordance with the disclosed embodiment, quick access to all of the features of the telephone terminal with just a few key presses of these menu keys. The menu keys include a "Back" key 221, a "Select" key 222, a "Next" key 223 and a "Home" key 225. Other well-known keys or buttons: a "Send" key 224, an "End" key 226 and a "Power" key 227, as well as others illustrated in the form of a dial pad, are also part of the telephone terminal shown in FIG. 2 but are conventional keys and need not be described in detail herein.

The Back key 221 allows a user to back up menu screen by menu screen. The Select key 222 selects the feature which is being displayed on the bottom line of the screen. The Next key 223 allows a user to go forward menu screen by menu screen. The Send key 224 and the End key 226 are conventional keys which, in a cellular system, are used to respectively send a just-entered or stored telephone number to a base unit and to terminate an established conversation. The Home key 225 is used to return a user to the original starting screen in the plurality of display screens. The Power key 227 provides operating power to the telephone terminal in a conventional manner.

The screen display changes dynamically as the user performs functions and makes selections via the Select key 222. Shown in the display 210 is just one menu screen in the hierarchically arranged menu. The illustrated entry is that of the original starting screen or the "Last Number" dialed which is conveniently provided for a user whenever the telephone terminal is turned ON from an OFF state or returned to its standby state after the user presses the End key 226, terminating a telephone call.

Figure 3:
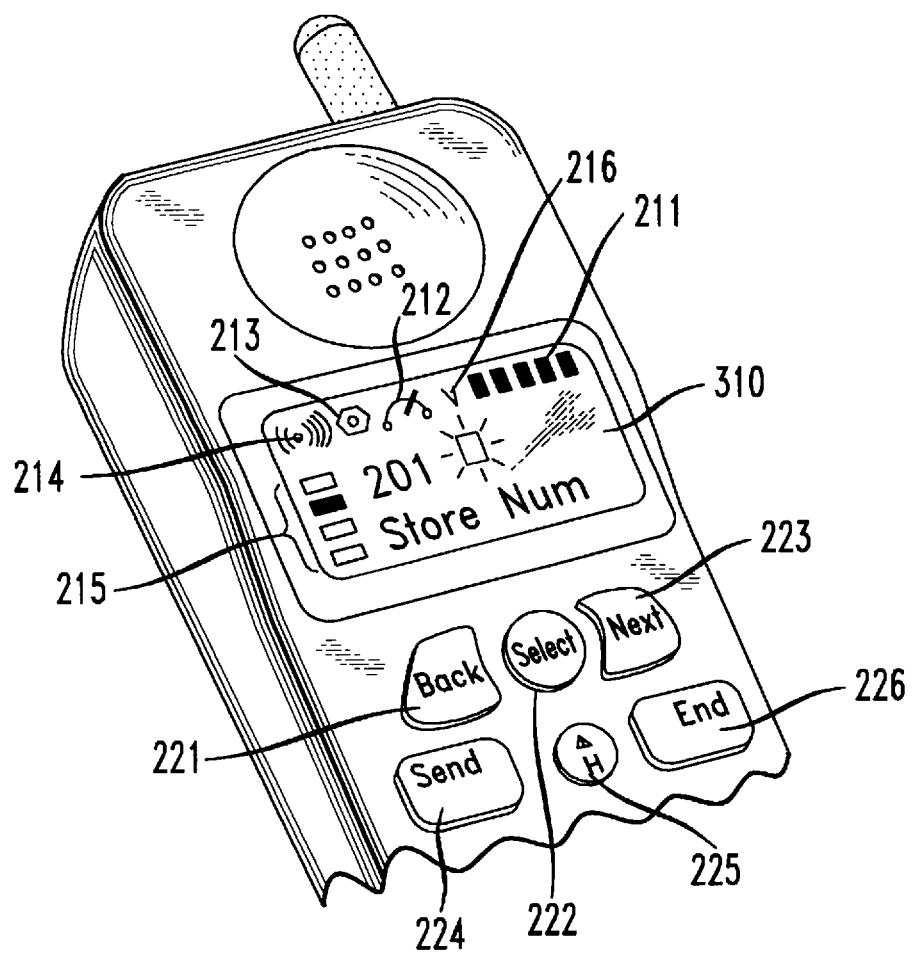
FIG. 3 illustrates the telephone terminal of FIG. 1 including a user interactive display displaying a second menu screen accessible in accordance with the present invention.
Figure 6:
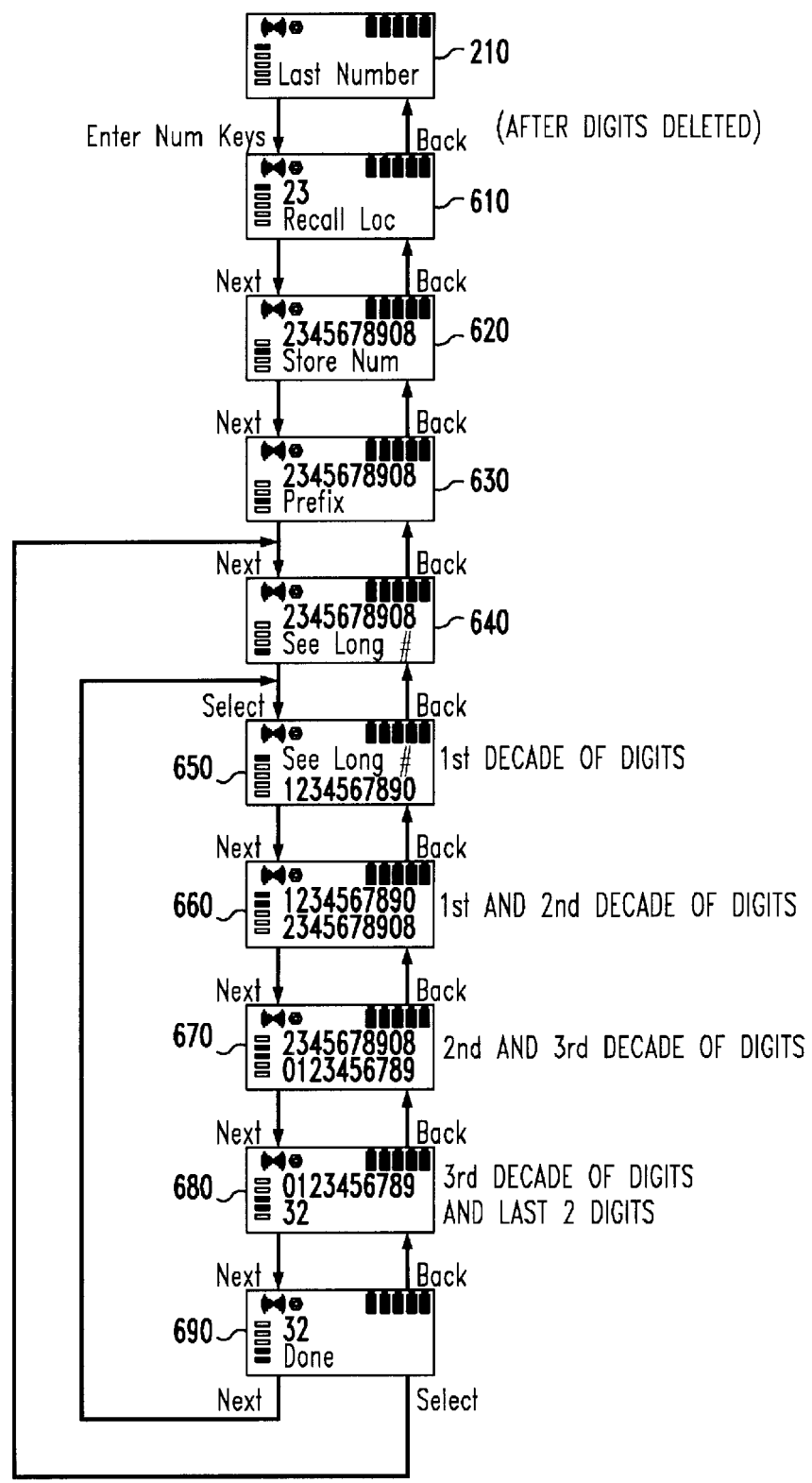

With reference next to FIG. 3, there is shown portions of the user interface 200, shown in FIG. 1, including screen display symbols 211 through 215 provided in a screen display 310. A blinking curser next to the three digits entered in screen display 310 prompts a user to enter additional digits. This "Store Num" screen shown in display 310 and in modified form in display 620 of FIG. 6 is described in detail later herein.

While the embodiment of the present invention is illustratively described as incorporated into a wireless telephone terminal, it should be recognized that the present command-operated terminal could be utilized in other program-controlled systems such as wired telephone terminals. Since such systems utilize a variety of hardware and programming techniques, no attempt is made to describe the details of the program used to control the telephone terminal. However, the present invention must be blended into the overall structure of the system in which it is used and must be tailored to mesh with other features and operations of the system. Thus, in order to avoid confusion and in order to enable those skilled in the art to practice the claimed invention, this specification will describe the operation of the present invention using the telephone terminal 100 shown in both FIGS. 1 and 2; the display screens shown in FIGS. 2 and 3; and the display screen flow diagrams of FIGS. 4 through 8 which, taken together, describe the logical steps and the various parameters required to implement the present invention.

Figure 4:
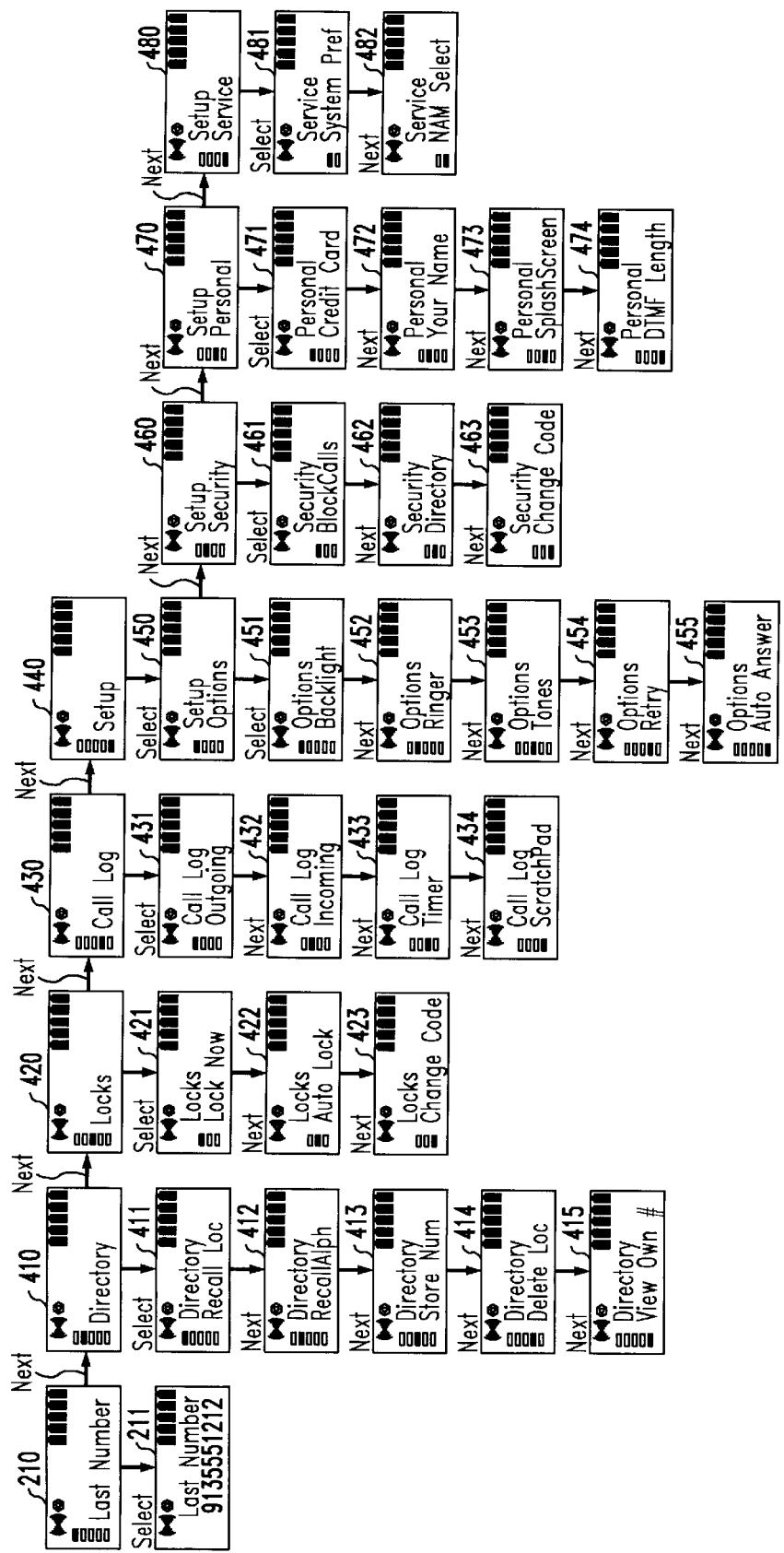
FIG. 4 is a flow chart illustrating some of the display screens provided by the circuitry shown in FIG. 1 and produced in an interactive display shown in FIGS. 2 and 3 in accordance with the invention.

Referring next to FIG. 4, there is shown a flow chart for illustrating some of the display screens provided by the circuitry in FIG. 1 and produced in the interactive display in the same manner as illustratively shown in display 210 in FIG. 2 and display 310 in FIG. 3. The sequence in which these display screens are provided is indicated by the flow chart, and is shown in sufficient detail to permit one skilled in the art to duplicate the circuitry of FIG. 1, either by programming a microprocessor or by special purpose logic circuitry such as is available in a digital signal processor.

The simplicity of the user interface is that all features illustrated by the display screens of FIG. 4 are accessible through the use of three keys—Select, Back, and Next. When the telephone terminal 100 is turned ON from an OFF state, the menu feature option, i.e., screen label Last Number, as shown in display 210 in both FIG. 2 and FIG. 4, appears in the display on the bottom line and the menu level indicator shows the outlines of five vertically aligned symbols or rectangular boxes with the outline of the top box being shaded or filled in. The user of the telephone terminal is thus informed when viewing the menu level indicator that the current display in the terminal is the top choice of a 5-choice menu.

To view the last number at the display screen 210, all the user need do is press the "Select" key. Alternatively, if the user would like to view other features within the telephone terminal, the user uses the Next key and combinations of the Next key and the Select key to access any other telephone feature illustrated in the multiple display screens. As easily understood with reference to FIG. 4, the Next key allows the user to move sideways through these equal-level menu choices, and the menu level indicator allows the user to determine which one of the menu choices is currently being viewed.

As the user repeatedly presses the Next key 223, shown in FIG. 2, the menu choice changes from Last number as shown in display 210 to "Directory" as shown in display 410; then to "Locks" as shown in display 420; next to "Call Log" as shown in display 430; and finally to "Setup" as shown in display 440. As each choice is viewed, a corresponding one of the vertically aligned array of rectangular boxes is filled in to allow the user to determine just where he or she is while navigating within the menu. By way of illustrative examples, for the Directory display 410, the second rectangular box from the top is filled in; for the Locks display 420, the third rectangular box from the top is filled in; for the Call Log display 430, the fourth rectangular box from the top is filled in; and finally, for the Setup display 440, the fifth rectangular box from the top is filled in. An additional press of the Next key 223 returns the user to the top Last Number display 210, and once again the top rectangular box in the vertical aligned array of rectangular boxes is filled in.

Each one of the equal level menu choices represented by menu screen displays 210, 410, 420, 430 and 440 provide a number of selectable optional screens that may be selected by the user of the telephone terminal 100. Once the user of the telephone terminal has decided which menu choice he or she wishes to explore, the Next key is used to place that choice on the bottom line of the display and the Select key 222 is pressed. By way of examples, first, by pressing the Select key 222, while at the display 210, the user selects the last number dialed and this number is shown in the display 211. Second, when the user presses the Select key 222 while at the display 410, the Directory displays 411 through 415 are selected. Third, when the user presses the Select key 222 while at the display 420, the Locks displays 421 through 423 are selected for display. Fourth, when the user presses the Select key 222 while at the display 430, the Call Log displays 431 through 434 are selected for display. Finally, when the user presses the Select key 222 while at the display 440, the Setup displays 450 through 455, 460 through 463, 470 through 474 and 480 through 482 can be accessed.

When the user specifically selects the setup option as a menu choice, the display is configured at the top choice of a 4-choice menu, which includes displays 450, 460, 470 and 480. And the menu level indicator allows the user to determine which one of the menu choices is currently being viewed. In this operative example, as the user repeatedly presses the Next key 223, the display moves sideways through these equal-level menu choices and the viewed menu choice changes from "Setup Options" as shown in display 450 to "Setup Security" as shown in display 460; then to "Setup Personal" as shown in display 470; and finally to "Setup Service" as shown in display 480. As each choice is entered, the menu level indicator allows the user to determine which one of the menu choices is currently being viewed by displaying a filled-in one of four vertically aligned rectangular boxes.

Figure 5:
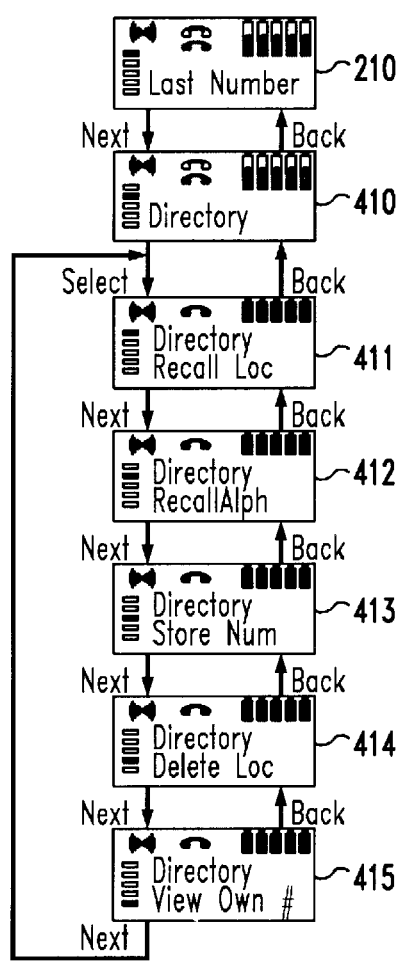
FIGS. 5 through 8 are flow charts illustrating some of the display screens provided by the circuitry shown in FIG. 1 and also illustrating how movement between these display screens is achieved, in accordance with the invention.

Referring next to FIG. 5, there is shown the simple steps that a user of the telephone terminal 100 takes in moving from the Last Number display 210 to the Directory display 410, selecting this display and then moving among the sub-displays 411 through 415 in this menu choice. Sequentially pressing the Next key while at either of displays 411 through 415 causes the terminal to cycle between these five displays and the display level indicator informs the user which one of the menu choices is being viewed by filling in a particular one of five vertically aligned rectangular boxes that are respectively associated with these menu choices.

FIG. 5 also shows the use of the Back key 221 and how a user, while at either of displays 411 through 415, is able to back up from each of these displays, to the Directory display 410 and on to the Last Number display 210. Just as the operation invoked by a user in pressing the Next key 223 is reflected in one of the vertically aligned rectangular boxes being filled in, the operation of the display through the Back key 221 also causes the appropriate one of of the vertically aligned rectangular boxes to be filled in.

Other sub-menu options are available from the main feature menu choices. They are logically grouped together and therefore advantageously related to the main menu choices. A user is thereby able to quickly develop a mental model of the feature menu choices and easily navigate through these menu selections.

Referring now to FIG. 6, there is shown a flow chart for illustrating a process for context-sensitive functionality for assisting a user in using the interactive display. In the operation of context-sensitivity functionality or support for the user, as the user completes a command function, the menu choices available to the user for that function changes to reflect the most likely function desired to be accessed by the user.

As the user enters digits of a telephone number, for example, the menu choices presented to the user in the interactive display automatically change. With a first preselected number of digits entered, a first choice offered to the user is the most likely option that the user would like to exercise. The user may then exercise this option by a press of a single key. When the number of digits entered exceeds the first preselected number of digits, a second choice is offered to the user. This second choice being the most likely option that the user would like to exercise and is accomplished by a press of a single key. Thus, as the user enters digits, the choices available to him or her automatically change to reflect the most likely function desired to be accessed by the user. With one or two digits entered as shown in screen 610, the choice is "Recall Loc", since the directory can have up to 2-digit location numbers. With more than 2 digits entered as shown in screens 310 and 620, the choice becomes "Store Num", since there are no directory locations with more than 2 digits. Thus, when the user enters a third digit, the bottom choice on the display automatically changes to Store Num, allowing the user upon a single press of the Select key to store the number entered into the telephone's directory. By using a single press of the "Select" button, the user has the same capability that requires two extra keys (STO and RCL) on other available and prior art wireless terminals. The "Store Num" option brings the user into the directory to assign the telephone number a location and a name if desired.

After all digits are entered, the user may store the number by pressing the select key 222. When this process is complete, the user is automatically returned to the home screen or Last Number display 210. Such a process is described in U.S. Pat. No. 5,371,788 issued on Dec. 6, 1994. Other choices within this menu include the area code prefix feature, as shown in screen 630, which permits the user to add a prefix such as an area code and a utility, selectable from screen 640, to view a number longer than 10 digits, the character limit of the display. This feature is called "See Long #" is specifically shown in screens 650, 660, 670, 680 and 690. All of these features are relevant to digit entry.

Occasionally, a user has the need to enter or view a telephone number longer than the available number of digits on a single line of the display. The character-based display in the disclosed embodiment herein permits a user to view, for example, only ten digits on a line. In order to permit the user to view a number having many more digits, the See Long # feature, which employs the menu level indicator symbols and a second available line in the display, is incorporated into the telephone terminal 100.

To initiate the See long # feature, the user presses the Select key while display 640 appears in the terminal. Once the Select key is pressed, When the user specifically selects the See Long # option as a menu choice, the display is configured at the top choice of a 5-choice menu, which includes displays 650, 660, 670, 680 and 690. And the menu level indicator is reconfigured in this operation in order to allow the user to determine which decade or combination of decades of digits of the number is currently being viewed.

In this operative example, while viewing the display 650, the user is able to observe the first decade of digits being displayed on the lower row of the display. In its reconfigured application, the menu level indicator also shows that the first decade of digits is being displayed by having the upper one of the five rectangular boxes filled in. As the user presses the "Next" key, the first decade of digits moves to the top one of two rows and a second decade of digits is displayed in the bottom row. Similarly, in the menu level indicator, the first rectangular box remains filled in and the second rectangular box from the top is also filled in to reflect the displaying of the first and second decades of digits, as shown in display 660.

An additional press of the Next key causes the second decade of digits to move to the top one of the two rows and a third decade of digits is displayed in the bottom row. At this display screen 670, the first rectangular box is no longer filled in and the second and third rectangular boxes from the top of this indicator are filled in for reflecting that the second and third decade of digits are being displayed. Another press of the Next key causes the third decade of digits to move to the top one of the two rows and any remaining digits are displayed in the bottom row. At this display screen 680, the first and second rectangular boxes are no longer filled in and the third and fourth rectangular boxes from the top of this indicator are filled in for reflecting that the third decade of digits and any remaining digits in the number are being displayed.

Yet another press of the Next key causes any remaining digits to move to the top one of the two rows and the word "Done" to be displayed in the bottom row for providing an indication that all digits have been displayed. At this display screen 690, the first, second and third rectangular boxes are no longer filled in and the fourth and fifth rectangular boxes from the top of this indicator are filled in for reflecting that the last of any remaining digits in the number are being displayed in the top row of the display. The word Done appears in the display, not only to give the user an easy means of exiting this feature, but also as a way of letting the user know that he or she is viewing the end of the number.

This See Long # feature also automatically sizes the number of displays to be shown based on the digits in the number. If, for example, a number were only 18 digits long, only three screen displays would be necessary to show the entire long number. Accordingly, only three rectangular boxes would be provided for showing these 18 digits with the first two boxes illustrating that numbers are in the first and second decades and the third box appearing to reflect that all decades of digits have been shown. Also in the third screen display in this example, the word Done would also appear on the bottom row of the display.

Figure 7:
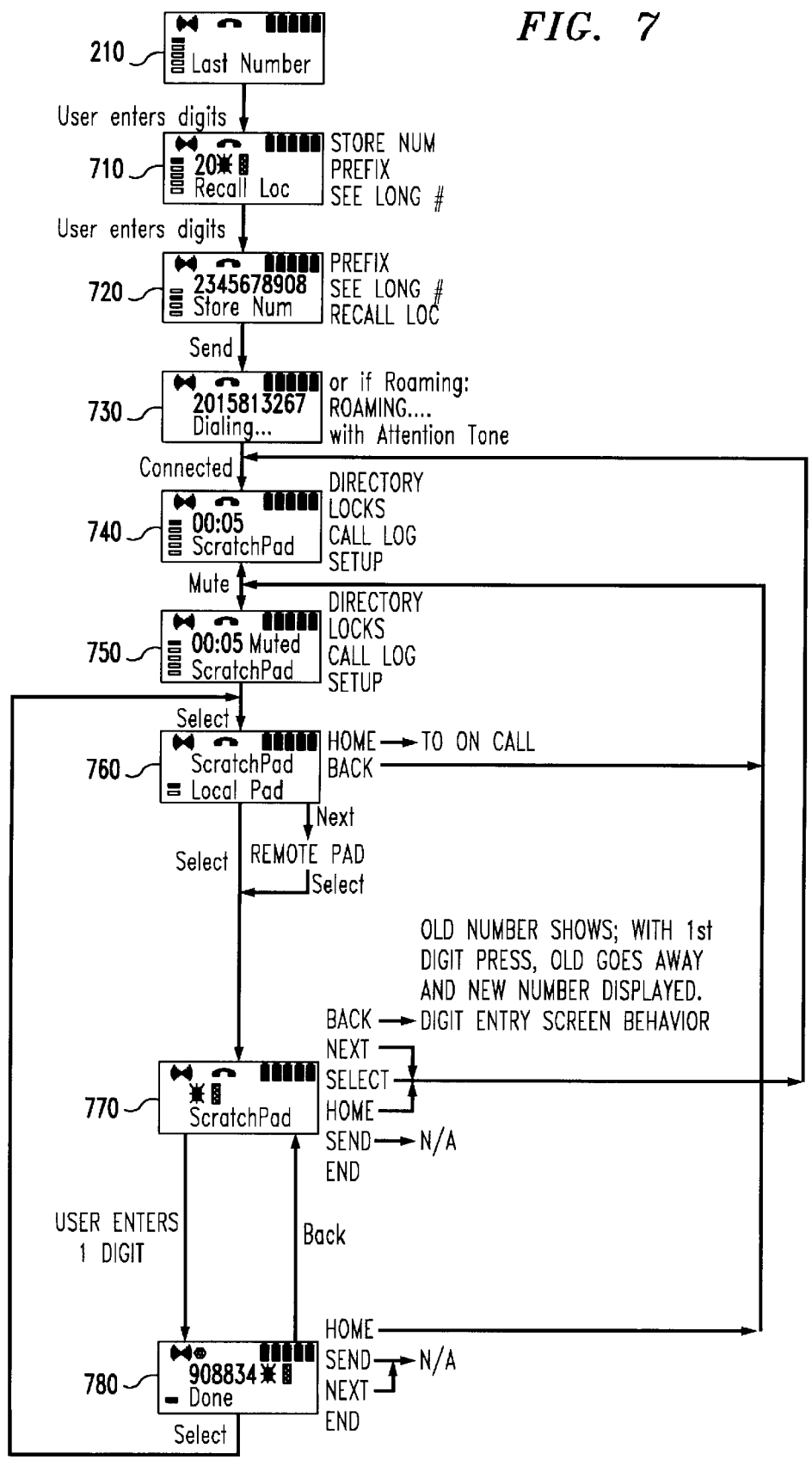

Referring next to FIG. 7, there is shown another flow chart for illustrating a process for context-sensitive functionality for assisting a user in using the interactive display. As the user goes off-hook into conversation mode, the menu choices again change to support the most likely choice to be used by the user during the conversation mode. By way of example, after a connection between the telephone terminal being used by a user and a far-end caller has been established, the menu choice appearing upon the screen is that feature most likely to be used while on the call.

In the process of originating a telephone call, while the telephone terminal is showing the menu option Last Number, as in display 210, a user enters the digits of the desired number. After the first two digits are entered, the process assumes that the user is attempting to recall a location in which a telephone number may be stored and presents the user with the screen choice "Recall Loc" shown in display 710. The other options available to the user at this point are "Store Num," "Prefix," and "See Long #." As additional digits are entered, the process then assumes that the user is storing a telephone number and presents the user with the most logical of the screen prompts, screen prompt "Store Num" shown in display 720. After all digits are entered, the user may either store the number by pressing the Select key or add a prefix such as an area code by pressing the Next key to move to the available Prefix display. If the user would like to confirm that a long number was entered correctly, then pressing the Next key once more selects the "See Long #" display. Also, if the user would like to return to the Recall Loc display, then pressing the Next key once more selects this display.

Once the user enters a number or recalls a number from the directory, and presses the send Key 224, the user is presented with the screen shown in display 730. After a connection to the far end is established, the following options are available to the user: "ScratchPad," as shown in screen 740, with the user being able to advance to the Directory, Locks, Call Log, and Setup menu choices. The menu choice ScratchPad is located at the top of this 5-choice menu since it is the most likely feature to be used while on a call.

The ScratchPad feature is an on-call feature which allows a user to enter a number while off-hook and in the conversation mode. This process also permits the user to allow a person at a remote telephone to use touch-tones from a remote key pad (not shown) and have a number entered on the Scratch Pad. This process for this feature is shown in screens 740, 750, 760, 770 and 780.

Display screen 750, also shows yet another on-call feature, wherein the user has pressed a mute button (not shown) on the side of the telephone terminal to "Mute" the microphone and thereby permits the user of the terminal to have a private local conversation. All these user menu actions are generally performed through the use of the Select key, following by combinations of the Next and Select key.

Figure 8:
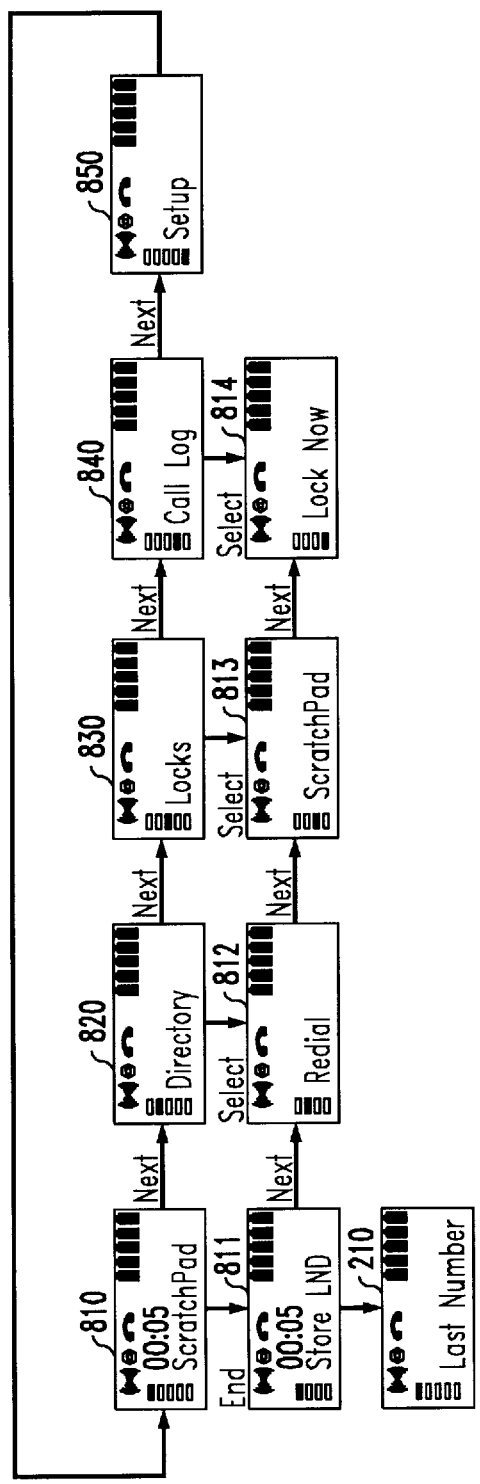

Referring next to FIG. 8, there is shown yet another flow chart for illustrating a process for context-sensitive functionality for assisting a user in using the interactive display. In this process, there is shown the state that the user interface enters whenever a call is ended, i.e., the user places the telephone terminal on-hook in the standby state. While in the on-call state, the menu option is typically that of the Scratch Pad shown in menu display 810. Other possible options selectable by the user while in the on-call state are Directory, shown in display 820, Locks, shown in display 830, Call Log, shown in display 840 and Setup, shown in display 850, these feature options being accessible through sequential presses of the Next key.

Once the telephone call has ended, the user interface automatically advances to the menu choice Store LND display 811 since it is the most likely feature to be used after terminating a call. Thus, the user is given an opportunity to store the entered number into the directory through a single press of the "Select" key. If no action is taken in a predetermined time by the user, by way of example, 10 seconds, the user interface automatically advances from the Store LND display 811 to the Last Number display 210. Other options available along with the Store LND option in this after-call state are Redial, shown in display 812, ScratchPad, shown in display 813 and Lock Now, shown in display 814, all of these options being available through sequential presses of the Next key.

The Store LND option takes the user into the directory to assign a telephone number, a location and a possible name. When this process is complete, the user is automatically returned to the "Last Number" or home screen. Such a process is described in U.S. Pat. No. 5,371,788. The Redial feature gives a convenient method of dialing the number immediately after a call has been terminated by pressing the End key. ScratchPad affords the user an opportunity to view the scratch pad after completion of a call without having to navigate all the way to the Call Log section of the menu. Lock Now simply allows the user to immediately lock the telephone after completion of a call.

What has been described is merely illustrative of the present invention. Other applications to telephone, computer or other user-interactive systems other than the disclosed system are contemplated as being within the knowledge of one skilled in the art and may be utilized without departing from the spirit and scope of the present invention.

We claim:

1. An arrangement for accessing selectable features of a telephone terminal, the arrangement comprising:

means for displaying a plurality of menu screens in a display device at said telephone terminal, each one of the plurality of menu screens containing an indication of one of a plurality of selectable features of said telephone terminal available at each one of a plurality of selectable levels, an indication of the total number of selectable levels associated with said indicated feature, and an indication of which of said associated selectable levels is being displayed; and a plurality of button means coupled to said means for displaying for accessing each one of the plurality of menu screens, a first one of the plurality of button means providing a means for moving from a displayed first menu screen at a first selectable level forward to a second menu screen at said first selectable level, a second one of the plurality of button means providing a means for moving backward from said displayed first menu screen to a third menu screen at said first selectable level, and a third one of the plurality of button means providing a means for selecting one from the plurality of menu screens at a second selectable level.

2. The arrangement of claim 1 wherein said first button means and said second button means provide access to each one of the menu screens available at said first selectable level.

3. The arrangement of claim 2 further including means for configuring said third one of the plurality of button means for selecting a specific one of the plurality of menu screens at said second selectable level from said displayed first menu screen.

4. The arrangement of claim 3 wherein said first, second and third button means respectively comprise first, second and third hard key buttons located on the telephone terminal.

5. The arrangement of claim 4 wherein said first hard key button comprises a Next key.

6. The arrangement of claim 4 wherein said second hard key button comprises a Back key.

7. The arrangement of claim 4 wherein said third hard key button comprises a Select key.

8. The arrangement of claim 1 further including a fourth one of the plurality of button means for executing a command function of said telephone terminal while at said displayed first menu screen.

9. The arrangement of claim 8 further including means for selecting a specific one of the plurality of menu screens at said second selectable level for display in response to execution of said command function by said fourth one of the plurality of button means.

10. The arrangement of claim 9 further including a fifth one of the plurality of button means for providing a means for moving from any displayed menu screen at any one of the plurality of selectable levels to a specific one of the plurality of menu screens at said first selectable level for display.

11. The arrangement of claim 10 wherein said fifth button means comprises a hard key button located on the telephone terminal.

12. The arrangement of claim 11 wherein said fifth hard key button comprises a Home key.

13. An arrangement for accessing selectable features of a telephone terminal, the arrangement comprising:

means for displaying a plurality of menu screens in a display device at said telephone terminal, each one of the plurality of menu screens containing an indication of one of a plurality of selectable features of said telephone terminal available at each one of a plurality of selectable levels, an indication of the total number of selectable levels associated with said indicated feature, and an indication of which of said associated selectable levels is being displayed;

button means coupled to said means for displaying for executing a command function of said telephone terminal while at a displayed first menu screen at a first selectable level; and means for selecting a specific one of the plurality of menu screens at a second selectable level for display in response to execution of said command function by said button means.

14. The arrangement of claim 13 wherein said command function includes a user entering digits on a keypad at the telephone terminal.

15. The arrangement of claim 13 wherein said command function includes a user going off-hook into a conversation mode at the telephone terminal.

16. The arrangement of claim 13 wherein said command function includes a user going on-hook into a standby mode at the telephone terminal.

17. A method of accessing selectable features of a telephone terminal, the method comprising the steps of:

displaying a plurality of menu screens in a display device at said telephone terminal, each one of the plurality of menu screens containing an indication of one of a plurality of selectable features of said telephone terminal available at each one of a plurality of selectable levels, an indication of the total number of selectable levels associated with said indicated feature, and an indication of which of said associated selectable levels is being displayed; and accessing each one of the plurality of menu screens through a user interface compnsing a plurality of buttons, the accessing step activating a first one of the plurality of buttons for moving from a displayed first menu screen at a first selectable level forward to a second menu screen at said first selectable level, a second one of the plurality of buttons for moving backward from said displayed first menu screen to a third menu screen at said first selectable level, and a third one of the plurality of buttons for selecting one from the plurality of menu screens at a second selectable level.

18. The method of claim 17 wherein said first button and said second button provide access to each one of the menu screens available at said first selectable level.

19. The method of claim 18 further including the step of configuring said third one of the plurality of buttons for selecting a specific one of the plurality of menu screens at said second selectable level from said displayed first menu screen.

20. The method of claim 17 further including the step of executing a command function of said telephone terminal while at said displayed first menu screen, said executing step being activated through a fourth one of the plurality of buttons.

21. The method of claim 20 further including the step of selecting a specific one of the plurality of menu screens at said second selectable level for display in response to execution of said command function by said fourth one of the plurality of buttons.

22. The method of claim 21 wherein the accessing step activates a fifth one of the plurality of buttons for moving from any displayed menu screen at any one of the plurality of selectable levels to a specific one of the plurality of menu screens at said first selectable level for display.

23. A method of accessing selectable features of a telephone terminal, the method comprising the steps of:

displaying a plurality of menu screens in a display device at said telephone terminal, each one of the plurality of menu screens containing an indication of one of a plurality of selectable features of said telephone terminal available at each one of a plurality of selectable levels, an indication of the total number of selectable levels associated with said indicated feature, and an indication of which of said associated selectable levels is being displayed;

executing a command function of said telephone terminal while at a displayed first menu screen at a first selectable level; and selecting a specific one of the plurality of menu screens at a second selectable level for display in response to the execution of said command function.

24. The method of claim 23 wherein said command function includes a user entering digits on a keypad at the telephone terminal.

25. The method of claim 23 wherein said command function includes a user going off-hook into a conversation mode at the telephone terminal.

26. The method of claim 23 wherein said command function includes a user going on-hook into a standby mode at the telephone terminal.

* * * * *